United States Patent Office 3,141,755
Patented July 21, 1964

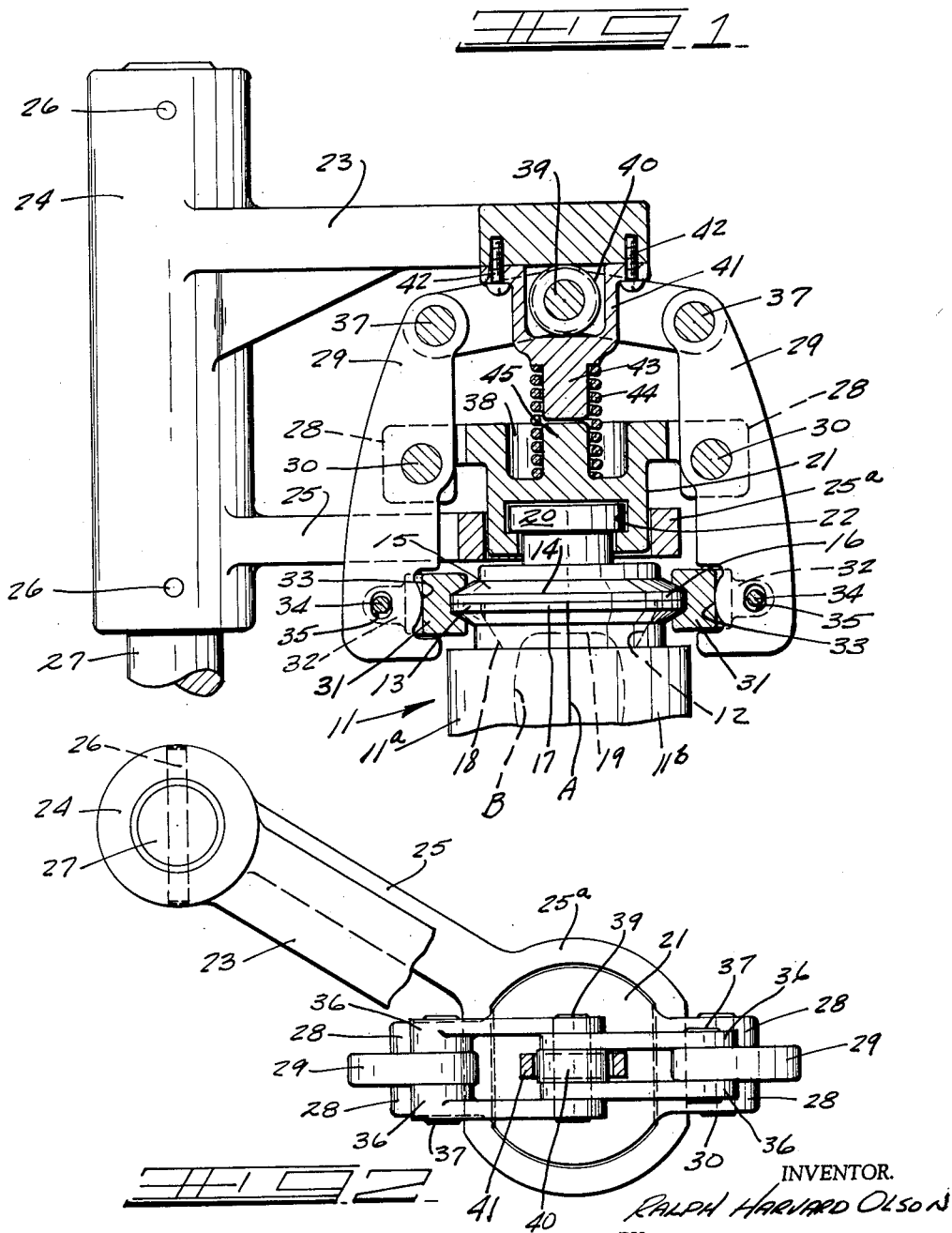

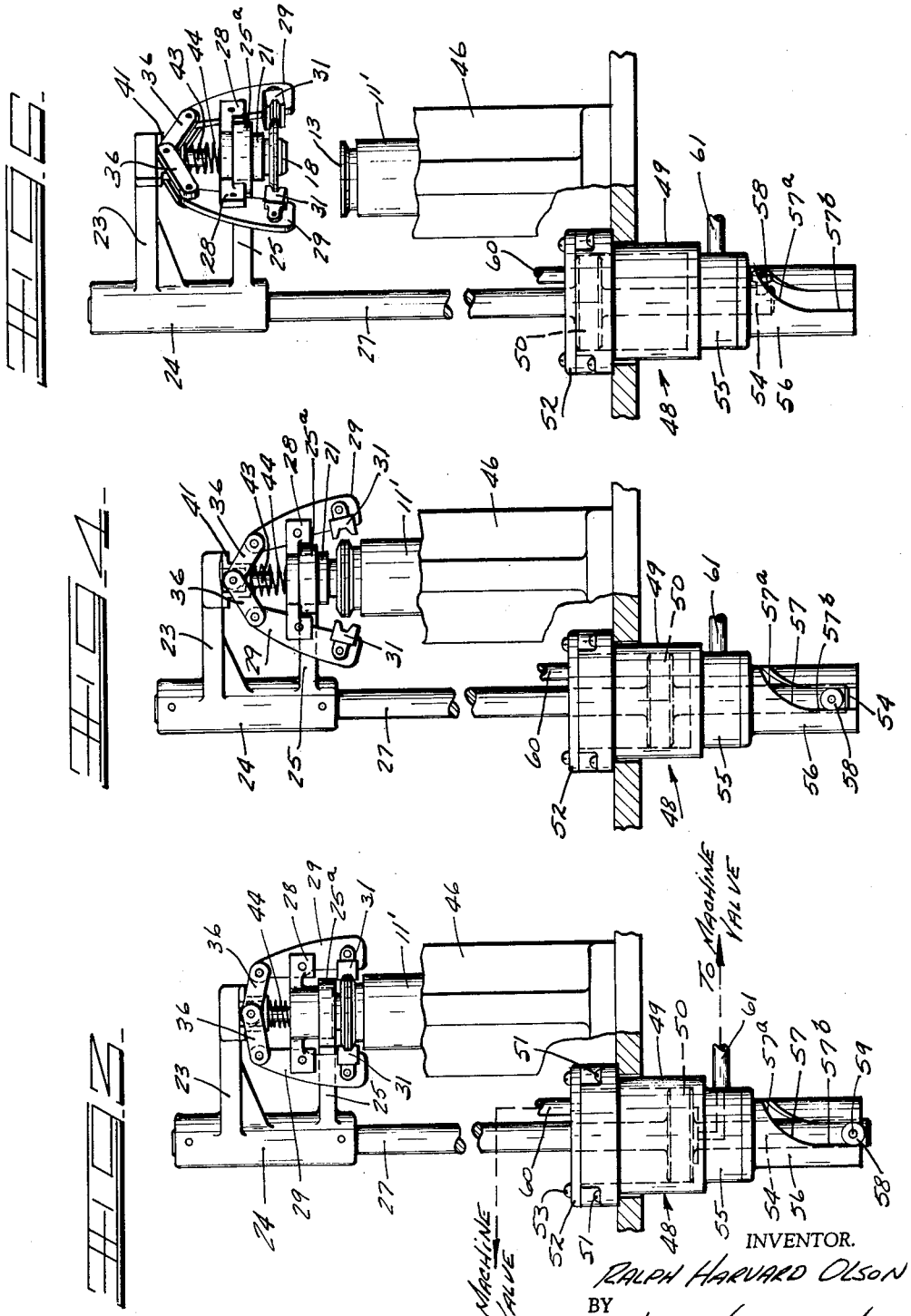

3,141,755
SELF-CLAMPING BAFFLE MECHANISM
Ralph H. Olson, Toledo, Ohio, assignor to Owens-Illinois Glass Company, a corporation of Ohio
Filed Apr. 11, 1960, Ser. No. 21,549
10 Claims. (Cl. 65—360)

The present invention relates to mechanism employed on glass forming machines, and, particularly, to a baffle mechanism and carriage for a blank mold assembly that includes a self-clamping device to clamp the mold and baffle tightly together in glass molding position automatically upon bringing the baffle and mold together at that position.

In glass forming machines presently employed, it is common practice to employ a blank mold which is disposed with the axis of its cavity vertical and open at opposite axial ends. A pair of cooperating neck rings or molds are manipulated to be adjacent the lowermost end opening of the mold, and charges of molten glass in the form of glass gobs are loaded to the mechanism through the open upper end of the blank mold. After the glass charge is loaded, the open upper end of the mold is closed by the baffle. Thus, with the mold charged with hot glass and the baffle seated to close the upper end opening of the mold, the mold components are arranged in their glass molding position. A plunger is registered with the neck rings and operated in a reciprocating fashion axially of the neck rings into and out of the blank mold cavity through the lower end opening of the overlying blank mold and the glass charge is formed to shape in the mold.

In prior baffle mechanism employed on these machines, the carriage device for moving the baffle into and out of glass molding position operates as a single function of the machine and is timed in the forming process. Mold clamps and baffle clamps are independently carried and timed according to their function on the machine.

One of the objects of the present invention is, therefore, to provide a combination of a baffle and holder, carriage device, and clamping mechanism, to clamp the baffle and one or more other components of a mold assembly tightly together in an operative position during the forming of a charge of glass to molded shape.

Another object of the invention is to provide mechanism, as just mentioned, that is automatically operated so that the multiple functions to be performed are controlled and actuated solely by the timed movement of the carriage device.

Another object of the invention is to provide such a self-clamping device, as mentioned, wherein relatively light-weight parts may be employed, thereby enabling high-speed motions in the operation of the mold assembly, with the added advantage of elimination of undue vibration.

A further object of the invention is to provide a mechanism of the type mentioned for use with existing machines, and which will enable extremely fast operation without danger of upsetting the proper sequence of the machine forming functions by obviating any malfunction that might otherwise arise under independent timing of the carriage device and clamps for the mold components.

A still further object of the invention is the provision of a new self-clamping baffle mechanism that is of simple light-weight construction having a minimum of parts for maintenance, and is readily adaptable for use with existing glass forming machines.

The specific nature of this invention, as well as other objects and advantages thereof, will become apparent to those skilled in the art from the following detailed description, taken in conjunction with the annexed sheets of drawings, on which, by way of preferred example only, is illustrated an embodiment of this invention.

In the drawings:

FIG. 1 is a partial elevational view, partly in section, showing a blank mold assembly that includes the present invention, and wherein the baffle is shown clamped to the mold in glass molding position, thus closing the upper end opening of a closed split blank mold, and the upper part of the mold halves being thereby clamped tightly closed.

FIG. 2 is a plan view of the apparatus of FIG. 1.

FIG. 3 is an elevational view of the apparatus of FIG. 1, and includes the baffle carriage and motor showing the relative position of the parts of a one-piece blank mold assembly and baffle clamped in their glass molding position.

FIG. 4 is an elevational view similar to FIG. 3, which shows the relative position of the parts of the apparatus at the time the baffle carriage is being raised to unclamp the baffle and move it toward a remote position.

FIG. 5 is an elevational view similar to FIG. 3, and in sequence with FIG. 4, which shows the relative position of the parts of the device after the baffle carriage is fully raised to the point where the baffle and clamp are at their remote position, whereat allowance is made for maneuvering the blank mold and liberating the formed parison, and also allowing for access to the top opening of the mold for charging it with a glass gob preparatory to performing the glass forming operation.

Referring to the drawings, a blank mold 11 is shown as being comprised of a pair of complementary mold halves 11a and 11b (FIG. 1) which are mounted on means (not shown) for moving them toward and away from each other so that, when closed, as shown on the drawings, their interfaces coincide on a mold parting line A. Alternatively, the blank mold may be of one-piece construction, as illustrated on FIGS. 3–5, thus eliminating the mold seam at the parting line A, but, aside from this just-mentioned difference, the one-piece blank mold would be similar to the split blank mold shown on FIG. 1. In either the split mold or one-piece mold, an interior cavity B is provided with its axis disposed vertically, and is open at the top and bottom ends. The top opening of the mold forms an annular baffle seat match 12. The upper ends of the mold halves 11a and 11b are provided with complementary annular bosses 13 having a common downwardly and inwardly tapering surface and an upper flat baffle seat surface 14.

A baffle 15 is shown on FIG. 1 closing the upper end opening of the mold cavity B. The baffle includes an annular boss 16 coextensive radially with boss 13 on the mold, and has an upwardly and inwardly tapering surface and a lower flat baffle seat surface 17. The two bosses 13 and 16, when juxtapositioned, form annular outwardly projecting clamping surfaces that form a generally wedge-shaped boss. Inwardly of the baffle seat 17, the baffle has a projection that provides a closure part for the mold opening. This provides a baffle seat matching surface 18 that corresponds to the mold seat match 12. The lower end of the baffle has a contoured molding surface 19 adapted to align on the mold cavity B and form the one end of the parison disposed opposite the container neck (not shown). The upper end of baffle 15 has a male joint 20 of a bayonet-type connector for attaching the baffle on a baffle holder member 21. A matching female joint 22 is provided at the lower end of the baffle holder member 21. This permits interchange of different baffles with change of mold for change of forming jobs.

A baffle carriage is provided which comprises a laterally disposed baffle arm 23 integral with a boss 24 that is pin-connected at 26 onto a vertical piston rod 27 of a reciprocating motor, the latter to be hereafter described.

Also integral with the boss 24 is a guide arm 25 having an annular guide ring 25a attached at its outer end. The baffle holder member 21 has opposed pairs of ears, each pair forming a yoke 28. The yokes 28 are disposed on opposite sides of the holder, and also disposed so as to be on opposite sides of the mold seam or parting line A. A toggle mechanism is attached to the baffle holder member 21 and connected to the baffle arm 23, as follows. A pair of complementary toggle arms 29 are pivotally connected at pins 30 through each of the yokes 28. Each of the arms 29 has a clamping shoe 31 mounted at its lower end. The shoes correspond to the wedge-shaped clamping surface of the bosses 13 and 16 formed when the baffle is seated on the mold opening. The mounting for the shoes 31 on their respective arms 29 permits a limited rocking movement, as well as a limited vertical movement, to enable the clamps 31 to adjust themselves for clamping the annular bosses 13 and 16 upon their closing or clamping movement. This mounting is shown as comprising a yoked mounting bracket 32 that fits about arm 29. At the lower portion of the arms 29 is a convex bearing surface 33. The shoe 31 is pin-connected at 34 through a vertically elongated slot 35 in each arm 29. The shoe 31 may thus rock a limited amount about its pivot 34 guided by bearing surface 33, and may slide a limited amount vertically through the connection by pin 34 in slot 35.

The upper ends of the toggle arms 29 are pivotally connected to two pairs of toggle links 36 (FIG. 2) at pivot pins 37. The two pairs of links 36 are commonly connected by a pivot pin 39. A roller 40 is also coxially mounted on pin 39 as a spacer between toggle links thereon. Thus, the links 36 are spaced-apart on the pin 39 by the journaled roller 40. The roller 40 fits in a yoke bracket 41 that is fastened to the underside of the baffle arm 23 by the cap screws 42. Thus, the baffle holder member 21, the baffle 15, and the toggle mechanism are all supported on the baffle arm 23 by the pivot pin 39, roller 40, and bracket 41. The underside of the bracket 41 has a projection 43 which serves as an upper guide for a compression spring 44. The spring 44 is also fitted in a lower guide 45 which takes the form of an upstanding projection in an annular well 38 in the baffle holder member casting. The spring 44 is thus compressed between the baffle arm and the baffle to normally urge them apart and normally urge the toggle arms 29 to pivot in a fashion corresponding to unclamping movement for the clamp shoes 31. In this regard, any resilient yieldable member may be utilized to perform the function of the spring 44.

Turning now to FIGS. 3–5, the operation of the apparatus will be described. The blank mold assembly, which, in this instance, is illustrated as a one-piece blank mold 11′, is suitably supported on a member 46 of the machine frame. At a suitable position on the machine frame member 46 is mounted the baffle cylinder motor 48 which comprises a cylinder 49 and piston 50. The motor 48 is secured by the mounting bolts 51. The cylinder head 52 is attached by its cap screws 53. The cylinder rod 27 of the baffle carriage is fastened to the piston 50 for movement therewith, and a lower piston rod extension 54, which may be an integral continuation of cylinder rod 27, is also attached to piston 50. The motor 48 is operated for driving its piston 60 through a raising and lowering movement. End casting 55 is rigidly connected with the lower end of the cylinder 49 of the motor and provides a vertical journal guide for the lower extension 54 of the cylinder rod. Fastened integral with the bottom end casting 55 is a lower cylindrical guide casting 56. The guide casting has a cam groove 57 which is formed to provide an upper curved segment 57a and an adjacent lower straight segment 57b. A cam roller 58 is pivotally connected to the piston rod extension 54 by a lateral stub shaft 59.

Thus, as the motor 48 is operated to provide the vertical raising and lowering movement for the cylinder rod 27, a coincident swinging movement is provided by the upper curved segment 57a of the cam 57 for swinging the baffle arm to a remote out-of-the-way position as illustrated on FIG. 5, as the piston 50 travels toward its upper limit of vertical movement. Beginning from this raised remote position on FIG. 5, during the downward movement of the piston the baffle carriage lowers, as well as swings, toward an intermediate aligning position for aligning the baffle 15 over the mold upper end opening. Once this intermediate position has been reached, the cam roller 59 travels in the straight segment 57b of the cam 57 so as to bring the baffle onto the mold to close the mold end opening, as shown on FIG. 4. At the time the baffle 15 engages its matching seat in the mold end opening, as earlier described, the toggle links 36 are urged, under the force of the spring 44, to retain the toggle arms 29 in their open or unclamping position. After the baffle has engaged the top end of the mold, the piston 50 of the motor 48 continues downward through a vertical over-travel span from the position on FIG. 4 to the position shown on FIG. 3. In this just-described over-travel of the baffle carriage, the baffle arm 23 moves relative to the seated baffle and actuates the toggle links 36 against the compression of the spring 44, thereby compressing it, causing the toggle arms 29 to pivot for bringing the clamping shoes 31 into clamping engagement on the annular bosses 13 and 16. In the position as is shown on FIG. 3, the baffle is clamped tightly to the upper end of the mold and, wherein a split mold is employed as is shown on FIG. 1, the upper parts of the mold are clamped tightly shut.

The baffle motor 48 is operated from a machine valve (not shown) of the glass forming machine. This machine valve is operated off the machine timing drum to supply pressurized fluid to the motor 48 through its conduit connections 60 or 61, and in the proper sequence for obtaining the movements above described. The movements of the motor 48 may thus be controlled in a conventional manner as, for example, according to the control of the baffle cylinder motor on the well-known Hartford-Empire IS (Individual Section) machine that operates substantially as disclosed in U.S. Patent No. 2,508,890, issued to G. E. Rowe. As indicated, the motor 48 arrangement will be varied from the prior arrangement in that after the baffle seats on the mold, an over-travel (continued downward movement) of the motor is herein provided. Therefore, in such machine under the present invention, the operation of the motor 48 is by control of a timing device to time the lowering and seating of the baffle on the blank mold in sequence with closing and loading that mold with glass. In accordance with the objects of the present invention, during the machine function of lowering and seating the baffle, the baffle is coincidentally automatically clamped by actuation of the toggle clamping mechanism.

Likewise, after pressing of the parison is completed, the operation of the motor 48 will be reversed. In so doing, the baffle arm 23 will begin to raise; however, the spring 44 will retain the baffle seated on the mold until the toggle mechanism has unclamped. This is accomplished by the spring 44 retaining the baffle seated while the upward movement of the baffle arm shortens the toggle link span (36) between the toggle arms 29.

Continued upward movement of the baffle arm 23, after the toggle arms unclamp the baffle and the mold, will raise the entire assembly, including the baffle, and, at the proper point, swing the assembly, inclusive of the baffle arm, to its remote position (FIG. 5).

According to the foregoing description of a preferred embodiment of the invention, it should be understood that the invention, in principle, is intended to clamp two or more component parts of the mold equipment tightly together in an operative position during forming of a glass article. The combination baffle, holder, carriage device and clamping mechanism have all of their functions controlled and actuated by the reciprocating motion of the carriage shaft or piston rod 27. Under the present invention, the sequence of operation is automatically taken care of in the arrangement of linkage of the various parts. It should be apparent, therefore, that if the entire assembly be built of relatively lightweight parts, it may achieve, thereby, high-speed motions in the glass forming cycles, as is presently desirable, and excessive vibration through such high-speed operation will be virtually eliminated. Additionally, and in respect to such high-speed operation, there is no danger of the proper sequence of the functions of the component mold parts becoming upset through malfunctioning, as in the case where independently timed drivers are used for each of the collective movements.

One further advantageous feature of the invention should be pointed out. The above-described mechanism allows for complete flexibility in height and size of molds used, as between very large size parison molds to the very small sizes. Adjustments in elevation of the baffle during operating cycle to suit a given mold size may be provided for in a number of ways. One such adjustment would be to change, according to the particular need, the location of attachment of the boss 24 of the carriage on the piston rod 27.

It will, of course, be understood that various details of construction may be modified through a wide range without departing from the principles of this invention, and it is, therefore, not the purpose to limit the patent granted hereon otherwise than necessitated by the scope of the appended claims.

I claim:

1. In a blank mold assembly of a gass forming mechanism, including a blank mold defining a cavity having an open end, the combination of a baffle for closing said open end of the mold after a mold charge of molten glass is deposited in the mold, toggle mechanism comprising toggle links and a pair of toggle arms, means for pivotally connecting said toggle arms with the baffle and on opposite sides of the latter, a carriage including a lateral baffle arm, pivot connections between one end of the toggle links and the baffle arm and the other end of the toggle links and the toggle arms, clamps connected on the toggle arms for clamping the baffle and the mold together, and a reversible drive means connected to the carriage for moving it in one direction to successively bring the baffle to close said open end of the mold and actuate the toggle mechanism to clamp the baffle and the mold tightly together, and for moving the carriage in the opposite direction to successively unclamp the baffle and the mold and thereafter move the baffle away from the mold, thereby uncovering its said open end.

2. In a blank mold assembly of a glass forming mechanism, a blank mold defining a cavity having its axis disposed vertically and including an upper end opening of said cavity, a baffle adapted at times to close said end opening, clamping surfaces on both the baffle and the mold, a carriage including a horizontally disposed arm, a toggle mechanism including toggle links pivoted on said carriage arm and toggle arms pivotally connected at one end to said links, a baffle holder member pivotally connected to said toggle arms below the toggle links, said holder member attached to the baffle to support the latter, means connecting a clamp member on each of the toggle arms below their pivots on said holder member and arranged to engage said clamping surfaces by pivoting said arms at times when the baffle is in position to close the end opening of the mold, and motor means connected to actuate said carriage for moving the baffle toward and away from the upper end opening of the mold and, coincident with each of said movements, actuating the toggle mechanism to, respectively, effect clamping and unclamping the baffle and blank mold.

3. The blank mold assembly of claim 2, wherein the blank mold is a partible mold comprised of complementary mold halves which define said cavity, when placed in juxtaposition, so that said baffle will be adapted to close its upper end opening, whereupon actuation of the carriage for bringing the baffle to close said end opening effects clamping the baffle and the juxtaposed mold halves to each other and said mold halves together.

4. The blank mold assembly of claim 2, including a resilient, yieldable member disposed between the underside of the carriage arm and the upper side of the baffle holder member which yields under relative downward movement between the carriage arm and the baffle after the latter closes the mold opening, thereby delaying clamping by the toggle mechanism until the baffle is seated on the mold opening, and, thereafter, upon initiating upward movement of the carriage arm, its positive resilient force is applied to retain the baffle on the mold opening until the toggle mechanism unclamps the baffle and the mold.

5. The blank mold assembly of claim 4, wherein the resilient, yieldable member comprises a spring, and including an upper spring guide on the underside of the carriage arm and a lower spring guide on the upper side of the baffle holder member, said upper and lower spring guides retaining said spring.

6. The blank mold assembly of claim 2, including a guide arm on the carriage and a guide member thereon spaced vertically below the carriage arm and in guiding relationship with the baffle holder member providing for relative vertical movement of the latter with respect to said guide member.

7. In a blank mold assembly of a glass forming mechanism, including a blank mold defining a cavity having its axis disposed vertically and including an end opening, the combination of a baffle for at times closing said end opening during operation for forming glass to shape in the mold, toggle mechanism comprising toggle links and a pair of toggle arms, means for pivotally connecting said toggle arms with the baffle on opposite sides thereof, a carriage including a lateral baffle arm, pivot connections between one end of the toggle links and the baffle arm and their other end and the toggle arms, clamps on the toggle arms arranged for clamping the baffle and the mold together during glass forming operation, drive means comprising a fluid-operated motor including a cylinder, piston and piston rod, the latter being connected to the carriage for moving the baffle arm between a remote position and a position for closing the mold end opening with the baffle and operating the toggle mechanism, a cam having a curved segment and an adjacent straight segment, and a cam follower connected for movement with said piston rod and running on said cam for guiding the baffle arm, said curved cam segment providing for swinging the baffle arm between said remote position and an intermediate position aligning the baffle with the mold end opening, said straight cam segment guiding the baffle arm vertically toward and away from the mold end opening from said intermediate position for, respectively, closing the mold end opening with the baffle and providing clamping actuation of the toggle mechanism, and providing unclamping actuation of the toggle mechanism and uncovering said end opening.

8. In combination, a blank mold having axially opposed end openings, a baffle member constructed for closing one of said end openings, said blank mold and baffle member being adapted to cooperate to receive a charge of molded glass and enclose said charge at a glass molding position for molding a glass article, a clamping means operable for clamping said mold and baffle member tightly together in said molding position, a driven carriage means connected to said baffle member and to said clamping means and operable for moving said baffle and clamping means collectively toward and away from the molding position, said carriage means comprising a vertical column, movable vertically, and a laterally disposed arm thereon, said clamp means comprising a toggle clamp including a pair of oppositely disposed toggle arms pivotally connected to said arm by toggle links, the baffle being disposed between said arms and connected to the carriage by a pivot connection on each of said arms, said clamping means being operated responsive to movement of the carriage means when said baffle is at molding position, and a motor connected to said carriage means for moving the latter to bring said baffle and said clamping means to glass molding position and operate said clamping means thereat.

9. In combination, a blank mold having axially opposed end openings, a baffle member constructed for closing one of said end openings, said blank mold and baffle member being adapted to cooperate to receive a charge of molded glass and enclose said charge at a glass molding position for molding a glass article, a clamping means operable for clamping said mold and baffle member tightly together in said molding position, a driven carriage means supporting said baffle member and said clamping means and operable for moving said baffle and clamping means collectively toward and away from the molding position, said clamping means comprising a toggle mechanism pivotally mounted on said carriage means, opposed clamp members on said toggle mechanism and supported thereby to engage the baffle and the blank mold when the former closes the one end of the latter, the toggle mechanism being operated responsive to movement of the carriage means when said baffle is in molding position, and a motor connected to said carriage means for moving the latter to bring said baffle and said clamping means to glass molding position and operate said clamping means thereat.

10. The combination defined in claim 8, including a guide arm attached to the column and spaced from the carriage arm, and a spring compressed between said carriage arm and the baffle, the guide arm providing a guide for the baffle for vertical movement of the latter relative to the carriage arm, the spring being compressed upon movement of the column vertically in the one direction as the baffle engages on the mold, thereby enabling the baffle to seat before the toggle arms begin to clamp, said spring serving to retain the baffle engaged on the mold and enable the toggle arms to unclamp before moving the baffle when the column is moved vertically in the other direction.

References Cited in the file of this patent
UNITED STATES PATENTS

| | | |
|---|---|---|
| 2,050,386 | Schutz | Aug. 11, 1936 |
| 2,496,016 | Nelson | Jan. 31, 1950 |
| 2,811,814 | Winder | Nov. 5, 1957 |
| 2,908,114 | Fouse | Oct. 13, 1959 |
| 3,067,598 | Schirm | Dec. 11, 1962 |